T. N. SEAY.
COTTON PLANTER.
APPLICATION FILED JUNE 30, 1910.

970,268.

Patented Sept. 13, 1910.

WITNESSES:
L. H. Schmidt.
Perry B. Turpin.

INVENTOR
Thomas N. Seay,
BY Munn & Co.
ATTORNEYS

UNITED STATES PATENT OFFICE.

THOMAS N. SEAY, OF COLUMBIA, SOUTH CAROLINA.

COTTON-PLANTER.

970,268.  Specification of Letters Patent. Patented Sept. 13, 1910.

Application filed June 30, 1910. Serial No. 569,679.

*To all whom it may concern:*

Be it known that I, THOMAS N. SEAY, a citizen of the United States, and a resident of Columbia, in the county of Richland and State of South Carolina, have invented certain new and useful Improvements in Cotton-Planters, of which the following is a specification.

This invention is an improvement in cotton planters and has for an object, among others, to provide a novel construction of reservoir or seed carrier in connection with a force feed wheel and means for operating both reservoir or carrier and the force feed wheel in such manner as to secure the desired discharge of the seed; and the invention has for further objects certain improvements in the general structure of the machine and consists in certain novel constructions and combinations of parts as will be hereinafter described and claimed.

Figure 1:
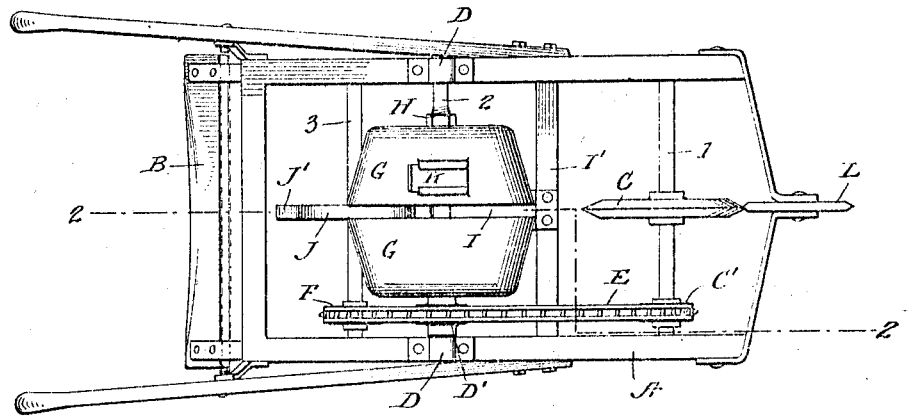
Figure 2:
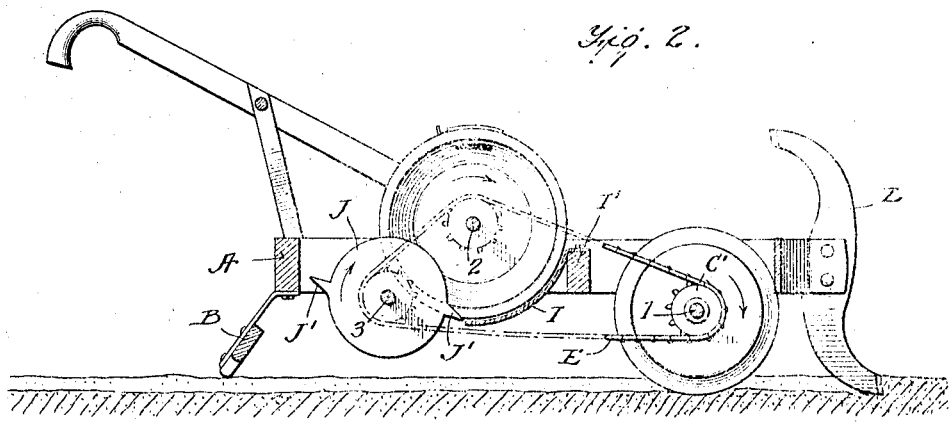
Figure 3:
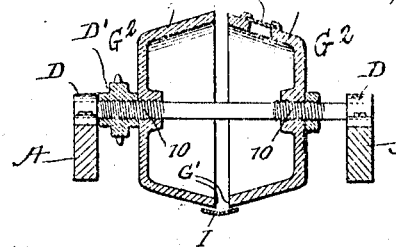

In the drawing Figure 1 is a top plan view and Fig. 2 is a vertical longitudinal section on about line 2—2 of Fig. 1 of a machine embodying my invention. Fig. 3 is a detail sectional view of the seed carrier, drawn longitudinally through the same and alongside the shaft.

In carrying out my invention I provide a suitable framing comprising side beams A in which are journaled the shafts 1, 2 and 3 and at the rear end of the frame I provide a coverer B of the form shown or of any suitable plow form as will be understood by those skilled in the art.

The shaft 1 carries the main wheel C and a sprocket wheel C'. The wheel C is arranged midway between the sides of the machine, runs on or in the ground and operates to give motion, by the turning of its shaft 1 to the other moving parts of the machine.

The shaft 2 which is journaled at D in the framing has a sprocket wheel D' meshed by a chain E and driven from the sprocket wheel C' and the shaft 3 has a sprocket wheel F meshed by the chain E and driven thereby as the wheel C is revolved in the operation of the invention.

The shaft 2 supports the seed reservoir or carrier which comprises the two similar cups G open at their adjacent ends G' and spaced slightly apart at said ends and flaring gradually toward their open ends G', as best shown in Figs. 1 and 3 of the drawing. At their outer ends the cups G are closed by the end plates $G^2$ which are screwed upon the threaded portions 10 of the shaft 2 so the open ends of the cup may be adjusted toward and from each other. A jam nut H operates against the outer closed end of one of the cups to secure the same in any desired adjustment, the other cup G being turned back against the fixed sprocket wheel D' as shown in Fig. 3.

The guard plate I is supported on a cross beam I' arranged slightly in advance of the seed reservoir and the said guard plate I extends downwardly below the space between the open ends of the cups G at the front of the reservoir as shown in Figs. 1 and 2 and prevents the discharge of seed at such point.

A force feed wheel J is secured on the shaft 3 and revolved by the turning of said shaft and this wheel J operates between the adjacent open ends of the cups G, see Figs. 1 and 2 and the feed wheel J is in the form of a disk having at its periphery a projecting tooth or teeth J', any suitable number of which may be employed. While I have shown the wheel J as provided with two teeth, manifestly but a single tooth may be employed if desired, or the teeth may be increased to such an extent as to drop the seed at any desired distance apart or to drill the seed in practically a row, as may be preferred by the operator.

Manifestly also the machine may be used as a guano distributer, and the fertilizer can be mixed with the seed in the reservoir or carrier and be discharged by the operation of the feed wheel with the seed.

One of the cup sections G is provided with a feed door K, see Fig. 1, by which the seed within the reservoir or carrier may be renewed from time to time.

An opener L supported at the front of the machine in line with the main wheel C operates to open the ground a sufficient depth for the reception of the seed discharged by the force feed wheel before described. It will be noticed that the opener, the main wheel and the force feed wheel are arranged in alinement with the direction of travel of the machine, so that the opener opens the way, the main wheel moves in the opening formed in the ground by the opener and the feed wheel discharges seed in the opening provided for such purpose.

It has been found in practice that a single wheel arranged as shown at C is preferable to the two side wheels ordinarily employed as it will readily adapt itself to all conditions of land in planting.

The provision of means for adjusting the seed reservoir or carrier permits its convenient adjustment to the force feed wheel so the latter will operate efficiently between the open ends of the cup sections of the carrier.

In practice it is intended to provide the wheels J in series with one, two four, and six teeth and to use these wheels alternately according to the character of the planting.

It will be noticed that the seed carrier and the force feed wheel are both driven from the main wheel axle and while the said carrier and feed wheel are both turned in the same direction, their adjacent parts, as shown in Fig. 2, move in reverse directions, securing an agitation of the seed in the carrier and a delivery of the seed by the feed wheel as is found desirable in the practical operation of the machine.

I claim:

1. A planter substantially as herein described, comprising the combination with the framing, of a main wheel, a shaft therefor provided with a sprocket wheel, a seed carrier, a shaft therefor provided with a sprocket wheel, the said seed carrier comprising two cup like sections open at their adjacent ends and spaced apart at such ends and having at their other ends plates screwing upon the shaft of said carrier, one of said cup sections abutting the sprocket wheel of the carrier, a jam nut on the shaft and screwing against the other section of the carrier, a force feed wheel operating between the spaced apart open ends of the seed carrier sections, a shaft for said feed wheel, a sprocket wheel on said shaft and a sprocket chain driven from the shaft of the main wheel and meshing with the sprocket wheels of the seed carrier shaft and the feed wheel shaft and operating to drive said shafts in the same direction, substantially as and for the purposes set forth.

2. A machine substantially as described, comprising a main wheel, a seed carrier in rear of the main wheel and comprising cup like sections open at their inner adjacent ends with the space between said ends in alinement with and in rear of the main wheel, a force feed wheel in rear of the seed carrier and operating between the adjacent open ends of the sections thereof and means for revolving said carrier and feed wheel from the main wheel, substantially as set forth.

3. The combination of a main wheel, a shaft therefor provided with a sprocket wheel, a seed carrier in rear of the main wheel and having cup like sections spaced apart at their inner adjacent ends, a shaft carrying said seed carrier and having a sprocket wheel, a force feed wheel operating between the spaced apart open ends of the seed carrier sections, a shaft carrying said feed wheel and provided with a sprocket wheel and a sprocket chain extending over the said sprocket wheels and driven by the main wheel and operating to turn the feed wheel and seed carrier in the same direction, said seed carrier and feed carrier moving in opposite directions at their overlapping points, all substantially as and for the purposes set forth.

THOMAS N. SEAY.

Witnesses:
J. B. R. MUTZE,
E. M. SHULL.